United States Patent Office 3,536,703
Patented Oct. 27, 1970

3,536,703
N - (3 - ALKOXY - 19 - NORPREGNA - 1,3,5(10), 17(20) - TETRAEN - 21 - YL)AMINES AND DERIVATIVES THEREOF
Frank B. Colton, Evanston, Richard A. Mikulec, Chicago, and Robert T. Nicholson, Glenview, Ill., assignors to G. D. Searle & Co., Chicago, Ill., a corporation of Delaware
No Drawing. Filed Sept. 11, 1968, Ser. No. 759,207
Int. Cl. C07c 173/10
U.S. Cl. 260—239.5                    11 Claims

ABSTRACT OF THE DISCLOSURE

N-(3-alkoxy-19 - norpregna-1,3,5(10),17(20) - tetraen-21-yl)amines and derivatives thereof preparable by reaction of a 21-halo-19-norpregna-1,3,5(10),17(20)-tetraen-3-ol-3-alkyl ether with the appropriate amine are useful as anti-microbial agents, e.g. anti-fungal, anti-bacterial, anti-protozoal and anti-algal. They possess also anti-germinant activity.

---

The present invention is concerned with novel chemical compounds characterized by a 21-amino group and a 17(20) double bond and, more particularly, with N-(3-alkoxy - 19 - norpregna-1,3,5(10),17(20)-tetraen-21-yl)-amines and derivatives thereof represented by the following structural formula

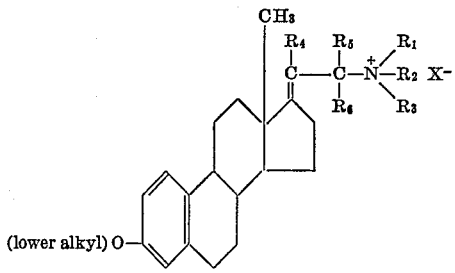

wherein $R_1$, $R_2$ and $R_3$ are selected from the group consisting of hydrogen, lower alkyl and aralkyl radicals or $NR_1R_2R_3$ represents an optionally-substituted heterocyclic amine, e.g. pyridine, quinoline, isoquinoline, α-picoline, β-picoline, γ-picoline, 3-chloropyridine, 2-, 3- and 4-carboxypyridine, and alkanoylpyridines such as 3-acetylpyridine or a heterocycloaliphatic amine such as N-alkylmorpholines, N-alkyl-piperidines and N-alkylpyrrolidines, $R_4$, $R_5$ and $R_6$ are selected from the group consisting of hydrogen and lower alkyl radicals, and X is a halogen atom, i.e. fluorine, chlorine, bromine, or iodine.

Examples of the lower alkyl radicals encompassed by the foregoing structural formula are methyl, ethyl, propyl, butyl, pentyl, hexyl, heptyl and the branched-chain groups isomeric therewith.

The aralkyl radicals denoted therein are typified by benzyl and phenethyl.

The compounds of the present invention are conveniently manufactured by utilizing as starting materials compounds represented by the following structural formula

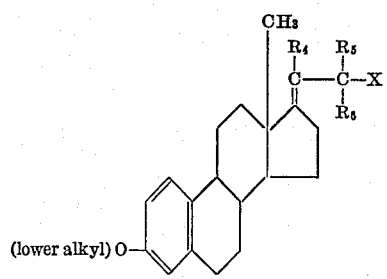

wherein $R_4$, $R_5$, $R_6$ and X are as hereinbefore described. The latter starting materials are produced by the reaction of the corresponding vinyl alcohol of the structural formula

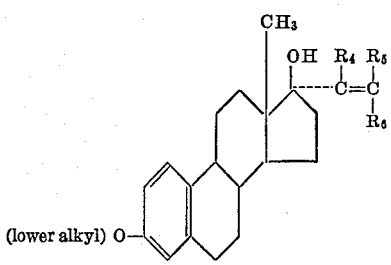

with the appropriate phosphorous trihalide. That process is specifically illustrated by the reaction of 17α-vinyl-estra-1,3,5(10)-triene-3,17β-diol 3-methyl ether in toluene with phosphorous tribromide in the presence of pyridine to afford 21-bromo-19-norpregna-1,3,5(10),17(20)-tetraen-3-ol 3-methyl ether.

Illustrative of the process for manufacture of the compounds of this invention is the reaction of 21-bromo-19-norpregna-1,3,5(10),17(20)-tetraen-3-ol 3-methyl ether in benzene with pyridine to yield N-(3-methoxy-19-norpregna-1,3,5(10),17(20) - tetraen-21-yl)pyridinium bromide.

A process especially adapted to the manufacture of the iodide salts of this invention involves the anion exchange between an instant chloride and a suitable ion exchange resin in the form of an iodide. For example, a methanolic solution of N,N,N-triethyl-N-(3-methoxy-19-norpregna-1,3,5(10),17(20) - tetraen-21-yl)ammonium chloride is passed through a column containing a polystyrene quaternary iodide anion exchange resin to afford N,N,N-triethyl-N-(3-methoxy-19-norpregna - 1,3,5(10),17(20) - tetraen-21-yl)-ammonium iodide.

The fluoride salts of this invention are alternatively manufactured by anion exchange. A convenient process is exemplified by the reaction of N-(3-methoxy-19-norpregna-1,3,5(10),17(20) - tetraen - 21 - yl)pyridinium bromide with an equivalent quantity of sodium hydroxide followed by reaction of the resulting quaternary hydroxide with hydrogen fluoride to afford N-(3-methoxy-19-norpregna-1,3,5(10),17(20)-tetraen - 21 - yl)pyridinium fluoride. An example of direct exchange is the reaction of N - (3 - methoxy - 19 - norpregna - 1,3,5(10),17(20)-tetraen - 21 - yl)pyridinium bromide with silver fluoride to afford N-(3-methoxy-19-norpregna - 1,3,5(10),17(20)-tetraen-21-yl)pyridinium fluoride.

Equivalent to the instant halide salts for the purposes of this invention are the corresponding non-toxic pharmaceutically acceptable salts, e.g. the citrate, oxalate, tartrate, maleate, ascorbate, gluconate, lactate, succinate, phosphate and sulfate.

The compounds of this invention are useful in view of their valuable pharmacological properties. They are, for example, anti-microbial agents as is evidenced by their anti-bacterial activity, e.g. against microorganisms such as *Diplococcus pneumoniae*, *Bacillus subtilis* and *Eschericia coli*, their anti-protozoal activity, e.g. against microorganisms such as *Tetrahymena gelleii*, their anti-fungal activity, e.g. against microorganisms such as *Trichophyton mentagrophytes*, *Candida albicans* and *Ceratocystis ulmi* and their anti-algal activity, e.g. against microorganisms such as *Chlorella vulgaris*. They are also anti-germinant agents, in particular against *Trifolium repens*.

The anti-bacterial and anti-algal properties of the instant compounds are specifically illustrated by the activity of N,N,N-triethyl-N-(3-methoxy-19-norpregna-1,3,5(10),17(20) - tetraen-21-yl)ammonium bromide, N-(3-methoxy - 19 - norpregna - 1,3,5(10),17(20) - tetraen-21- yl)pyridinium bromide and N,N-diethyl-N-(3 - methoxy-19-norpregna-1,3,5(10),17(20) - tetraen - 21 - yl)amine hydrochloride when tested in the following assay:

Sterlie blood agar is inoculated with a 24-hour broth cluture of the bacterium *Diplococcus pneumoniae* or sterile Bristol agar is inoculated with an aqueous suspension of the alga *Chlorella vulgaris*, whereupon 5 mg. of the test compound is placed on the inoculated agar surface. The inoculated agars are incubated, in the case of the bacterium at 36° C. for 24 hours and in the case of the alga at room temperature under artificial light for 7 days, at the end of which time they are examined for microbial growth. Activity is indicated by a clear zone of inhibition of growth surrounding the test compound.

The anti-protozoal properties of these compounds is specifically illustrated by the activity of N,N,N-triethyl-N - (3 - methoxy - 19 - norpregna - 1,3,5(10),17(20)-tetraen-21-yl)ammonium bromide, N-(3-methoxy-19-norpregna - 1,3,5(10), 17(20)-tetraen-21-yl)pyridinium bromide and N,N-diethyl - N - (3 - methoxy-19-norpregna-1,3,5(10),17(20) - tetraen - 21 - yl)amine hydrochloride when tested in the following assay:

A sterile nutrient medium composed of 12 g. of proteose peptone, 8 g. of sucrose and 1000 ml. of distilled water is inoculated with a viable axenic culture of *Tetrahymena geleii*, then is incubated at room temperature for 24 hours. At the end of that time a 0.5 ml. quantity is transferred aseptically to a test tube containing approximately 5 mg. of the test compound. A test tube containing the culture alone serves as a control. The tubes are incubated at room temperature for 24 hours, then are examined microscopically in order to determine the degree of growth of the microorganism. A compound is considered active if it results in a definite inhibition of growth as compared to the control.

The anti-fungal property of the instant compounds is specifically illustrated by the activity of N,N,N-triethyl-N-(3-methoxy - 19 - norpregna-1,3,5(10),17(20)-tetraen-21-yl)ammonium bromide, N-(3-methoxy-19-norpregna-1,3,5(10),17(20)-tetraen-21-yl)pyridinium bromide and N,N - diethyl-N-(3-methoxy-19-norpregna - 1,3,5(10),17 (20)-tetraen-21-yl)amine hydrochloride when tested in the following assay:

The test compound is dissolved or suspended in melted Sabouraud agar and is held at 80° C. for 20 minutes. Dilutions are made from this preparation in melted Sabouraud agar in order to give concentrations of the test substance of 1000, 100, 10 and 1 mcg./ml. in the agar. The agar is permitted to cool and solidify and is then surface inoculated with a suspension of spores of *Trichophyton mentagrophytes, Candida albicans* or *Ceratocystis ulmi*. The inoculated medium containing *Trichophyton mentagrophytes* or *Ceratocystis ulti* are incubated at room temperature (ca. 25° C.) for 6–7 days and those containing *Candida albicans* incubated at room temperature for about 48 hours. The media are then examined grossly for the presence or absence of growth of the test organism. Control preparations lacking the test compound are employed for comparative purposes. The activity of a test compound is reported as mcg. of the compound/ml. of agar which completely prevents visible growth of the test organism.

The invention will appear more fully from the examples which follow. These examples are given by way of illustration only and are not to be construed as limiting the invention either in spirit or in scope as many modifications both in materials and in methods will be apparent to those skilled in the art. Temperatures are given in degree centrigrade (° C.) and quantities of materials in parts by weight except where otherwise noted.

EXAMPLE 1

To a solution of 11.4 parts of phosphorous tribromide in 87 parts of toluene, in a nitrogen atmosphere, is added, at approximately −8°, a solution of 20 parts of 17α-vinylestra-1,3,5(10)-triene-3,17β-diol 3-methyl ether in 87 parts of toluene containing 1 part of pyridine. Stirring is continued for about 1 hour during which time the reaction mixture is kept between −5 and 0°. The mixture is then allowed to warm to room temperature over a period of about 2 hours, at the end of which time it is diluted with ice, then stirred for approximately 1 hour longer. The layers are separated and the organic layer is washed successively with dilute hydrochloric acid, dilute aqueous sodium bicarbonate and water until neutral. Drying over anhydrous sodium sulfate followed by distillation of the solvent under reduced pressure affords a residual oil which crystallizes upon standing. Purification of that material by recrystallization from ether affords 21 - bromo - 19 - norpregna - 1,3,5(10),17(20)-tetraen-3-ol 3-methyl ether, melting at about 90–92°.

EXAMPLE 2

The substitution of an equivalent quantity of phosphorous trichloride in the procedure of Example 1 results in 21 - chloro-19-norpregnal - 1,3,5(10),17(20)-tetraen-3-ol 3-methyl ether.

EXAMPLE 3

When an equivalent quantity of 17α-vinylestra-1,3,5(10)-triene-3,17β-diol 3-ethyl ether is substituted in the procedure of Example 1 there is produced 21-bromo-19-norpregna - 1,3,5(10),17(20) - tetraen - 3 - ol 3-ethyl ether.

EXAMPLE 4

To a solution of 4.65 parts of 21-bromo-19-norpregna-1,3,5(10),17(20)-tetraen-3-ol 3-methyl ether in 53 parts of benzene is added 4.4 parts of triethylamine and the resulting reaction mixture is heated with stirring at the reflux temperature for about 1 hour. At the end of that reaction period the mixture is cooled to room temperature and the resulting precipitated product is collected by filtration. That crude product is washed on the filter with benzene, then is purified by recrystallization from acetone to afford N,N,N-triethyl-N-(3-methoxy-19-norpregna - 1,3,5(10),17(20) - tetraen - 21 - yl)ammonium bromide, melting at about 176–180° with decomposition. This compound is represented by the following structural formula

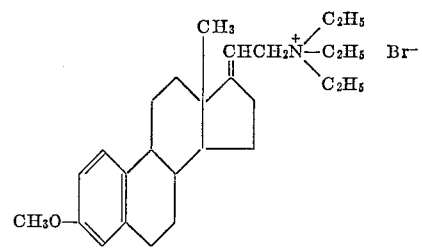

EXAMPLE 5

By substituting an equivalent quantity of 21-bromo-19-norpregna - 1,3,5(10),17(20) - tetraen - 3 - ol 3 - ethyl ether and otherwise proceeding according to the processes described in Example 4, there is obtained N,N,N-triethyl-N-(3-ethoxy - 19 - norpregna - 1,3,5(10),17(20)-tetraen 21-yl)ammonium bromide.

EXAMPLE 6

When an equivalent quantity of 21 - chloro - 19 - norpregna - 1,3,5(10),17(20) - tetraen - 3 - ol 3-methyl ether is substituted in the procedure of Example 4, there is obtained a product which, after recrystallization from acetone, affords N,N,N - triethyl-N-(3 - methoxy - 19-norpregna - 1,3,5(10),17(20) - tetraen - 21 - yl)ammonium chloride, melting at about 194–195° with decomposition. This compound is represented by the following structural formula

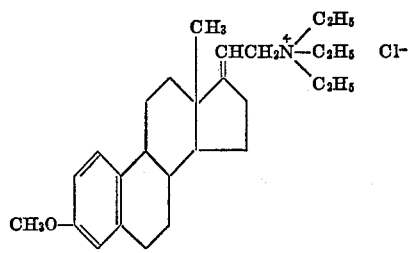

EXAMPLE 7

A mixture containing 1 part of 21-bromo-19-norpregna-1,3,5(10)17(20) - tetraen - 3 - ol 3-methyl ether, 0.5 part of pyridine and 22 parts of benzene is heated with stirring at the reflux temperature for about 1 hour, then is cooled to room temperature. The resulting crystalline precipitate is collected by filtration, washed on the filter with benzene, then purified by recrystallization from ethanol-ether, thus affording N-(3 - methoxy-19-norpregna-1,3, 5(10),17(20) - tetraen - 21 - yl)pyridinium bromide, which melts at about 203–204°. This compound is represented by the following structural formula

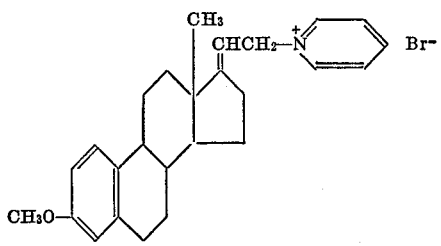

EXAMPLE 8

A mixture consisting of 1.55 parts of 21 - bromo-19-norpregna - 1,3,5(10),17(20)-tetraen - 3 - ol 3-methyl ether, 0.6 part of diethylamine and 22 parts of benzene is heated in a nitrogen atmosphere at the reflux temperature for about 1 hour. The mixture is then cooled at room temperature and the resulting precipitated solid is removed by filtration. Evaporation of the filtrate under reduced pressure affords a residue, which is triturated with ether. The resulting solid is removed by filtration and the filtrate is evaporated to dryness under reduced pressure. The oily product containing N,N-diethyl-N-(3-methoxy-19-norpregna - 1,3,5(10),17(20)-tetraen - 21 - yl)amine is dissolved in 42 parts of ether and 0.44 part by weight of 25% isopropanolic hydrogen chloride is added dropwise. The resulting precipitated solid is removed by filtration and washed on the filter with ether, then recrystallized from water to afford N,N-diethyl-N-(3-methoxy-19-norpregna - 1,3,5(10),17(20)-tetraen - 21 - yl)amine hydrochloride, melting at about 265–278° with decomposition. That compound is represented by the following structural formula

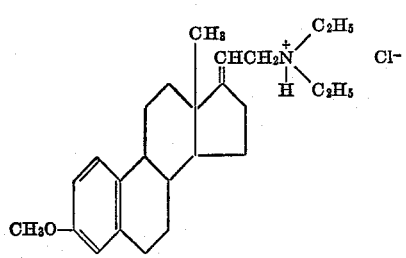

EXAMPLE 9

To a solution of 3.75 parts of 21 - bromo - 19 - norpregna - 1,3,5(10),17(20) - tetraen - 3 - ol 3-methyl ether in 88 parts of benzene is added 20 parts by volume of 25% methanolic trimethylamine and the resulting reaction mixture is heated at the reflux temperature for about 1 hour, then is allowed to cool. The crystalline product which separates upon cooling to room temperature is collected by filtration and purified by recrystallization from ethanol, thus affording N,N,N-trimethyl-N-(3-methoxy-19-norpregna-1,3,5(10),17(20) - tetraen - 21-yl)ammonium bromide, melting at about 221.5–222°. This compound is represented by the following structural formula

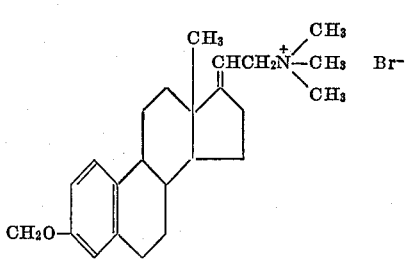

EXAMPLE 10

A solution of 0.48 part of N,N,N-triethyl - N - (3-methoxy - 19 - norpregna - 1,3,5(10),17(20)-tetraen-21-yl)ammonium chloride in 40 parts of methanol is passed through a column consisting of 10 parts of a polystyrene quaternary iodide anion exchange resin. An additional 40 parts of methanol is passed through the column and the combined effluent is evaporated to dryness under reduced pressure to afford, as a cream-colored solid, N,N,N-triethyl-N-(3 - methoxy-19-norpregna - 1,3,5(10),17(20)-tetraen - 21 - yl)ammonium iodide, melting at about 154–155.5°. This compound is represented by the following structural formula

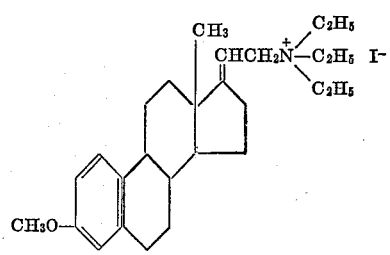

EXAMPLE 11

A mixture containing 3.75 parts of 21-bromo-19-norpregna-1,3,5(10),17(20)-tetraen-3-ol-3-methyl ether in 88 parts of benzene and 3.8 parts of tri-n-propylamine is heated at the reflux temperature for about 1 hour, then is allowed to cool to room temperature. The crude product which separates is purified by recrystallization from acetone-ether to afford colorless crystals of N,N,N-tri-n-propyl - N - (3 - methoxy-19-norpregna-1,3,5(10),17(20)-tetraen-21-yl)ammonium bromide hemihydrate, melting at about 120–128°. This compound is represented by the following structural formula

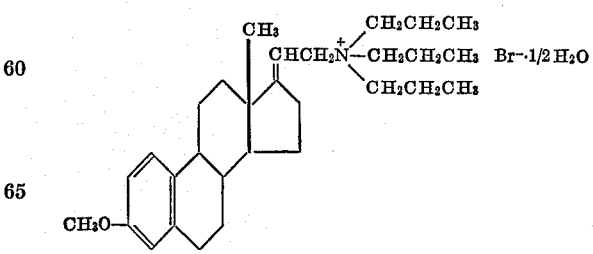

EXAMPLE 12

To a solution of 3.75 parts of 21-bromo-19-norpregna-1,3,5(10),17(20)-tetraen-3-ol 3-methyl ether in 88 parts of benzene is added 3.9 parts of tri-n-butylamine and the resulting reaction mixture is heated at the reflux temperature for about 1 hour. At the end of that time the mixture is allowed to cool to room temperature, then is concentrated to dryness under reduced pressure to afford, as a glass, N,N,N-tri-n-butyl-(3-methoxy-19-norpregna-1,3,5(10),17(20)-tetraen-21-yl)ammonium bromide. This compound is represented by the following structural formula

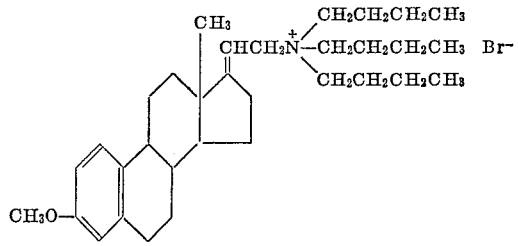

EXAMPLE 13

A mixture containing 3.75 parts of 21-bromo-19-norpregna-1,3,5(10),17(20)-tetraen-3-ol 3-methyl ether, 4.6 parts of N,N-dimethylbenzylamine and 88 parts of benzene is heated at the reflux temperature for about 1 hour, then is cooled to room temperature. The crystalline material which separates is collected by filtration and purified by recrystallization from ethanol to afford colorless prism-like crystals of N-benzyl-N,N-dimethyl-N-(3-methoxy - 19 - norpregna - 1,3,5(10),17(20) - tetraen-21-yl) ammonium bromide, which melts at about 196–197°. This compound is represented by the following structural formula

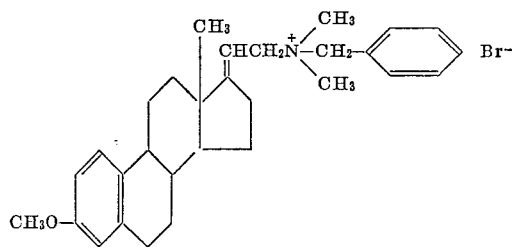

EXAMPLE 14

A mixture containing 3.75 parts of 21-bromo-19-norpregna-1,3,5(10),17(20)-tetraen-3-ol 3-methyl ether, 5 parts by volume of N-methylmorpholine and 88 parts of benzene is heated at the reflux temperature for about 1 hour, then is cooled to room temperature. The crude product which crystallizes from the reaction mixture upon cooling is collected by filtration and purified by recrystallization from ethanol to afford pure prism-like crystals of N-methyl-N-(3-methoxy-19-norpregna-1,3,5(10),17(20)-tetraen-21-yl)morpholinium bromide, melting at about 198.5–199.5°. This compound is represented by the following structural formula

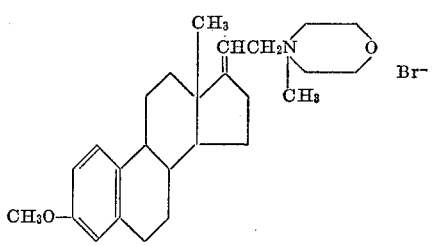

EXAMPLE 15

To a solution of 3.75 parts of 21-bromo-19-norpregna-1,3,5(10),17(20)-tetraen-3-ol 3-methyl ether in 88 parts of benzene is added 4.8 parts of γ-picoline and that reaction mixture is heated at the reflux temperature for about 1 hour, then is cooled to room temperature. The crystalline product which separates is collected by filtration and purified by recrystallization from isopropyl alcohol to afford N-(3-methoxy-19-norpregna-1,3,5(10),17(20)-tetraen-21-yl)-γ-picolinium bromide as colorless prism-like crystals, melting at about 198–199°. This compound is represented by the following structural formula

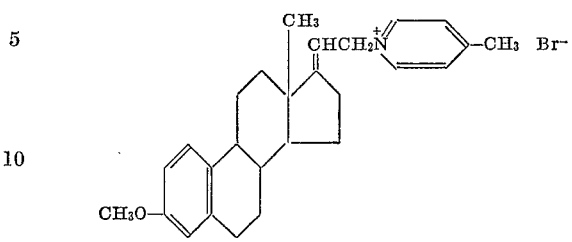

EXAMPLE 16

A mixture containing 3.75 parts of 21-bromo-19-norpregna-1,3,5(10),17(20)-tetraen-3-ol 3-methyl ether, 4.8 parts of β-picoline and 88 parts of benzene is heated for approximately 1 hour at the reflux temperature, then is allowed to cool to room temperature. The resulting crystalline crude produce is collected by filtration, then is recrystallized from ethanol-ether to afford colorless needle-like crystals of N-(3-methoxy-19-norpregna-1,3,5(10),17(20)-tetraen-21-yl)-β-picolinium bromide hemihydrate, melting at about 189–190°, and represented by the following structural formula

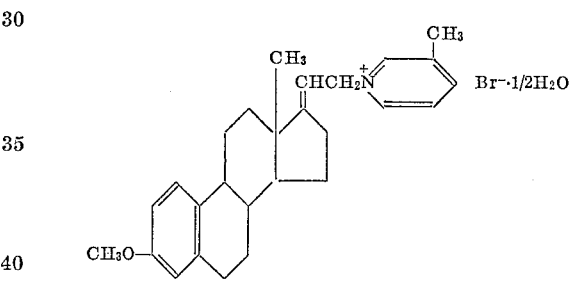

EXAMPLE 17

To a solution of 3.75 parts of 21-bromo-19-norpregna-1,3,5(10),17(20)-tetraen-3-ol 3-methyl ether in 88 parts of benzene is added 4.8 parts of α-picoline and the reaction mixture resulting is heated at the reflux temperature for about 1 hour, then is cooled to room temperature. The crystalline material which separates from the reaction mixture is collected by filtration and is purified by recrystallization from isopropyl alcohol to afford cream-colored needle-like crystals of N-(3-methoxy-19-norpregna - 1,3,5(10),17(20)-tetraen-21-yl)-α-picolinium bromide hemihydrate, melting at about 166–167°. This compound is represented by the following structural formula

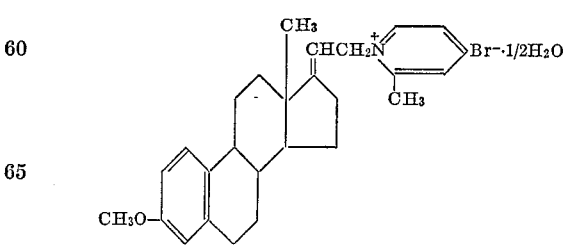

EXAMPLE 18

A mixture containing 3.75 parts of 21-bromo-19-norpregna-1,3,5(10),17(20)-tetraen-3-ol 3-methyl ether, 5 parts by volume of 3-chloropyridine and 88 parts of benzene is heated at the reflux temperature for about 1 hour, then is cooled to room temperature. The crystalline material which separates from the mixture is collected by filtration and recrystallized from ethanol to afford cream-colored prism-like crystals of N-(3-methoxy-19-norpregna - 1,3,5(10),17(20) - tetraen - 21 - yl)-3-chloropyridinium bromide, melting at about 181.5–182°. This compound is represented by the following structrual formula

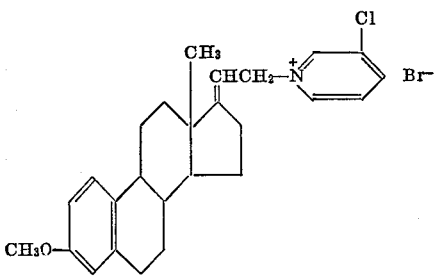

What is claimed is:
1. A compound of the formula

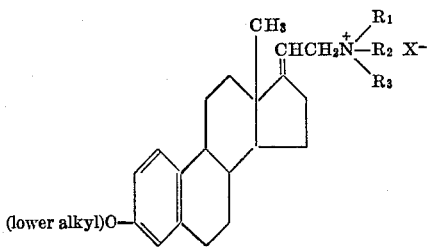

wherein $R_1$ is selected from the group consisting of hydrogen, lower alkyl and benzyl and $R_2$ and $R_3$ are lower alkyl or $NR_1R_2R_3$ represents a tertiary amine selected from the group consisting of N-methylmorpholine and those of the formula

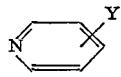

Y being hydrogen or a lower alkyl or chloro group, and X is a halogne atom.
2. As in claim 1, a compound of the formula

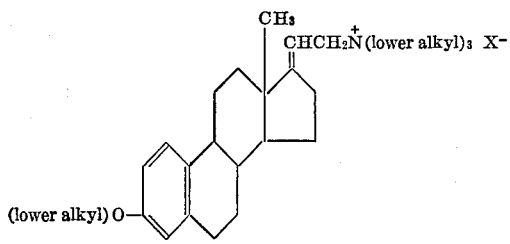

wherein X is a halogen atom.

3. As in claim 1, a compound of the formula

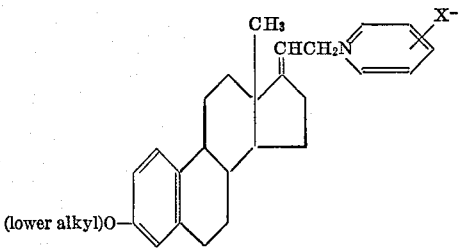

wherein Y is hydrogen or a lower alkyl or chloro group and X is a halogen atom.

4. A compound according to claim 1, wherein the lower alkyl radical is methyl, $R_1$, $R_2$ and $R_3$ are ethyl and X is chlorine, that compound being N,N,N-triethyl-N-(3-methoxy - 19-norpregna-1,3,5(10),17(20)-tetraen-21-yl)-ammonium chloride.

5. A compound according to claim 1, wherein the lower alkyl radical is methyl $R_1$, $R_2$ and $R_3$ are ethyl and X is bromine, that compound being N,N,N-triethyl-N-(3-methoxy - 19-norpregna-1,3,5(10),17(20)-tetraen-21-yl) ammonium bromide.

6. A compound according to claim 1, wherein $NR_1R_2R_3$ is pyridine, the lower alkyl radical is methyl and X is bromine, that compound being N-(3-methoxy-19-norpregna - 1,3,5(10),17(20)-tetraen-21-yl)pyridinium bromide.

7. A compound according to claim 1, wherein $R_1$ is hydrogen, $R_2$ and $R_3$ are ethyl, the lower alkyl radical is methyl and X is chlorine, that compound being N,N-diethyl - N - (3 - methoxy-19-norpregna-1,3,5(10),17(20)-tetraen-21-yl)amine hydrochloride.

8. A compound according to claim 1, wherein $R_1$, $R_2$ and $R_3$ are methyl, the lower alkyl radical is methyl and X is bromine, that compound being N,N,N-trimethyl-N-(3 - methoxy - 19-norpregna - 1,3,5(10),17(20)-tetraen-21-yl)ammonium bromide.

9. A compound according to claim 1, wherein $R_1$ is benzyl, $R_2$ and $R_3$ are methyl, the lower alkyl radical is methyl and X is bromine, that compound being N-benzyl - N,N - dimethyl - N - (3-methoxy-19-norpregna-1,3,5(10),17(20)-tetraen-21-yl)ammonium bromide.

10. A compound according to claim 1, wherein the lower alkyl radical is methyl, $NR_1R_2R_3$ is N-methylmorpholine and X is bromine, that compound being N-methyl - N - (3-methoxy-19-norpregna-1,3,5(10),17(20)-tetraen-21-yl)morpholinium bromide.

11. A compound according to claim 1, wherein the lower alkyl radical is methyl, $NR_1R_2R_3$ is γ-picoline and X is bromine, that compound being N-(3-methoxy-19-norpregna - 1,3,5(10),17(20) - tetraen-21-yl)-γ-picolinium bromide.

References Cited
UNITED STATES PATENTS
3,361,743  1/1968  Benn _____ 260—239.5

ELBERT L. ROBERTS, Primary Examiner

U.S. Cl. X.R.
195—51; 260—397.5